United States Patent [19]

Menssen

[11] 4,028,026
[45] June 7, 1977

[54] SCREW COMPRESSOR WITH INVOLUTE PROFILED TEETH

[75] Inventor: Ernst Menssen, Horren, Germany

[73] Assignee: Linde Aktiengesellschaft, Wiesbaden, Germany

[22] Filed: June 9, 1975

[21] Appl. No.: 584,820

Related U.S. Application Data

[63] Continuation-in-part of Ser. No. 379,303, July 16, 1973, abandoned.

[30] Foreign Application Priority Data

July 14, 1972 Germany .......................... 2234777

[52] U.S. Cl. ................................. 418/201; 74/458
[51] Int. Cl.² .................... F01C 1/16; F16H 55/04; F04C 17/12
[58] Field of Search .......... 418/197, 201, 202, 203; 74/462, 458

[56] References Cited

UNITED STATES PATENTS

| | | | |
|---|---|---|---|
| 1,412,889 | 4/1922 | O'Brien | 74/462 |
| 1,453,395 | 5/1923 | Labberton | 74/462 |
| 1,690,931 | 11/1928 | Hammar | 74/462 |
| 2,462,924 | 3/1949 | Ungar | 418/201 |
| 3,247,736 | 4/1966 | Roth | 74/462 |
| 3,314,598 | 4/1967 | Lysholm | 418/201 |
| 3,414,189 | 12/1968 | Persson | 418/201 |
| 3,423,017 | 1/1969 | Schibbye | 418/201 |
| 3,773,444 | 11/1973 | Koch | 418/201 |
| 3,787,154 | 1/1974 | Edstrom | 418/201 |

Primary Examiner—John J. Vrablik
Attorney, Agent, or Firm—Karl F. Ross; Herbert Dubno

[57] ABSTRACT

A screw-type gas compressor has a pair of meshing rotors each formed with a plurality of helical ribs. The flanks of the ribs of one of these rotors are generally convex and at least partially formed as involutes. The flanks of the ribs of the other rotor are generally concave and at least partially formed as involutes. These shapes are formed by the rack-generating process or by hobbing.

1 Claim, 5 Drawing Figures

SCREW COMPRESSOR WITH INVOLUTE PROFILED TEETH

CROSS-REFERENCE TO RELATED APPLICATION

This application is a continuation-in-part of copending patent application Ser. No. 379,303 filed July 16, 1973, now abandoned.

FIELD OF THE INVENTION

The present invention relates to a screw compressor. More particularly, this invention concerns a rotor structure for such a screw compressor.

BACKGROUND OF THE INVENTION

A screw compressor in which a gas is caused to expand against a rotor has a housing in which a pair of intermeshing rotors turn. At one end of the housing there is an inlet or intake port and at the other end an outlet or output port. The rotors are formed with meshing helical formations having the general form of multiple screw threads.

As the rotors turn in opposite senses they form a plurality of helical chambers or channels. Each chamber is defined at one side by an axial end of the housing and at the other side by a region of contact between two meshing helical formations. This region moves axially from inlet end to outlet end, compressing air ahead of it against the outlet end of the compressor and drawing air in through the inlet. When the helical chamber so formed is brought around to the outlet port, the compressed gas is expelled.

The efficiency of such compressors or expansion machines depends mainly upon the tightness of the seal between the rotors and the housing. The rotors form with each other a helical line of seal that must be as tight as possible in order for any efficiency to be obtained. This, of course, requires that the rotors be machined very carefully. Usually the so-called main rotor is formed with four helical threadlike formations which are semicircular in section. The secondary rotor is formed with six mating helical semicircular recesses, and the two parallel rotors are of like outer diameter. Thus one of these rotors wipes the other so that the flanks of the ribs of the main rotor must be very steep adjacent their root, and the flanks of the ribs of the secondary rotor must be very steep adjacent their tops. Machining of these surfaces is very difficult as a very small clearance angle is required which makes the cutting operation very slow and rapidly dulls the cutting tool. The tools must be reground frequently, which greatly increases the cost of the machining and hence of the compressor.

As a result of the cost of the machining to make the rotors for such screw machines usable as compressors, pumps, or expansion machines, they are frequently considered too expensive even though the particular advantages of such devices—small size, long service life—would make them ideal for many tasks.

OBJECTS OF THE INVENTION

It is, therefore, an object of the present invention to provide an improved screw machine of the aforementioned type.

Another object is the provision of an improved rotor structure for such a machine.

Yet another object of the present invention is to provide a method of making an inexpensive rotor for a screw machine.

SUMMARY OF THE INVENTION

These objects are attained according to the present invention in a screw machine of the above-described general type having rotors whose profiles are at least partially of involute shape. In this manner the helical formations, hereinafter referred to as ribs, are basically formed as involute helicoids. It has been found according to the present invention that the choice of an inexpensive method of shaping the rotors by means of a tool having straight flanks does not worsen the seal. The pressure of generating angle is approximately 20°, although conventional tools with angles of 12°, 15°, 25° and 30° are also usable.

The term pressure angle, as defined in *Mechanical Design and Systems Handbook* by Rothbart (McGraw-Hill: 1964), refers to the angle between the line along which the force exerted by one tooth on the mating tooth and the common tangent to the meshing circles at the mesh point. The pressure angle is traditionally determined by the selection of the workpiece material and is established by the shape of the involute. The diameter of the base circle is determined from the diameter of the arc and the abovementioned pressure angle and is, moreover, the product of the partial arc and the cosine of the pressure angle.

A fixed generating angle must be used in the normal plane, that is the plane normal to the helix at a given point, which is also the angle at which the tool lies when the teeth are cut. This gives rotors with different length/diameter ratios end profiles which do not have congruent shapes since the transverse pressure angle, taken in a plane perpendicular to the axis of rotation of the respective rotor, increases as the lead angle of the rotor threads increases. Oppositely thereto the shapes of the profiles in a plane perpendicular to the axis of rotation of the hitherto known screw machines are alike regardless of the length/diameter ratio.

The rotor profile according to the present invention is formed partially of involutes and partially of other curves and forms a seal line which has only minor interruptions. The prior-art rotors of the type with semicircular profile teeth have a relatively large gap between the following flank of the main rotor and the preceding flank of the secondary rotor so that gas under pressure can leak back into a chamber with lower pressure. According to the present invention this interruption where leakage can occur is reduced proportionally to the size of the involute regions.

In accordance with this invention these involute regions are formed adjacent the root of the teeth of the main rotor and adjacent the crown of the teeth of the secondary rotor. Furthermore, the teeth may be rounded off adjacent these involute regions to even further reduce leakage. This rounded-off region, according to further features of the present invention, is circularly arcuate with its center of curvature on the meshing circle of the respective rotor.

According to the invention a profile shift can be provided in the involute gearing. In this case the pitch circle of the rotor and the pitch circle of the tool do not coincide. Such a profile shift prevents, when the number of teeth is low, that the tops of the teeth of the cutting rack undercut the teeth of the rotor and thereby interrupt its convex shape.

According to yet another feature of the invention the pressure angle is different on different flanks of the teeth. For example, with one flank having a circularly arcuate profile in transverse section the pressure angle on this flank is larger. This also allows larger rotors to be made more easily by processes other than hobbing for a hobbing machine would have to be extremely big to machine such a large rotor.

The rotor according to the present invention is produced by the dividing method, advantageously by means of a threading die or by the use of tools such as disk or shaft milling heads. Indeed it is possible to use any involute form of gear generation so long as it permits a sufficiently steep helical angle to be produced.

The expansion machine according to the present invention is a screw compressor having an axial inlet and an axial outlet and is not a radial displacement machine which is actually a positive-displacement machine. In the compressor according to the present invention the main rotor supplies approximately 90% of the power while the auxiliary rotor takes up approximately 10%, this auxiliary rotor serving primarily a sealing function. The use of integral or unitary rotors formed with continuous generally helical ribs make the machine seal tightly and causes it to act as a positive displacement machine.

DESCRIPTION OF THE DRAWING

The above and other objects, features, and advantages will become more readily apparent from the following description, reference being made to the accompanying drawing in which.

SPECIFIC DESCRIPTION

Figure 1:
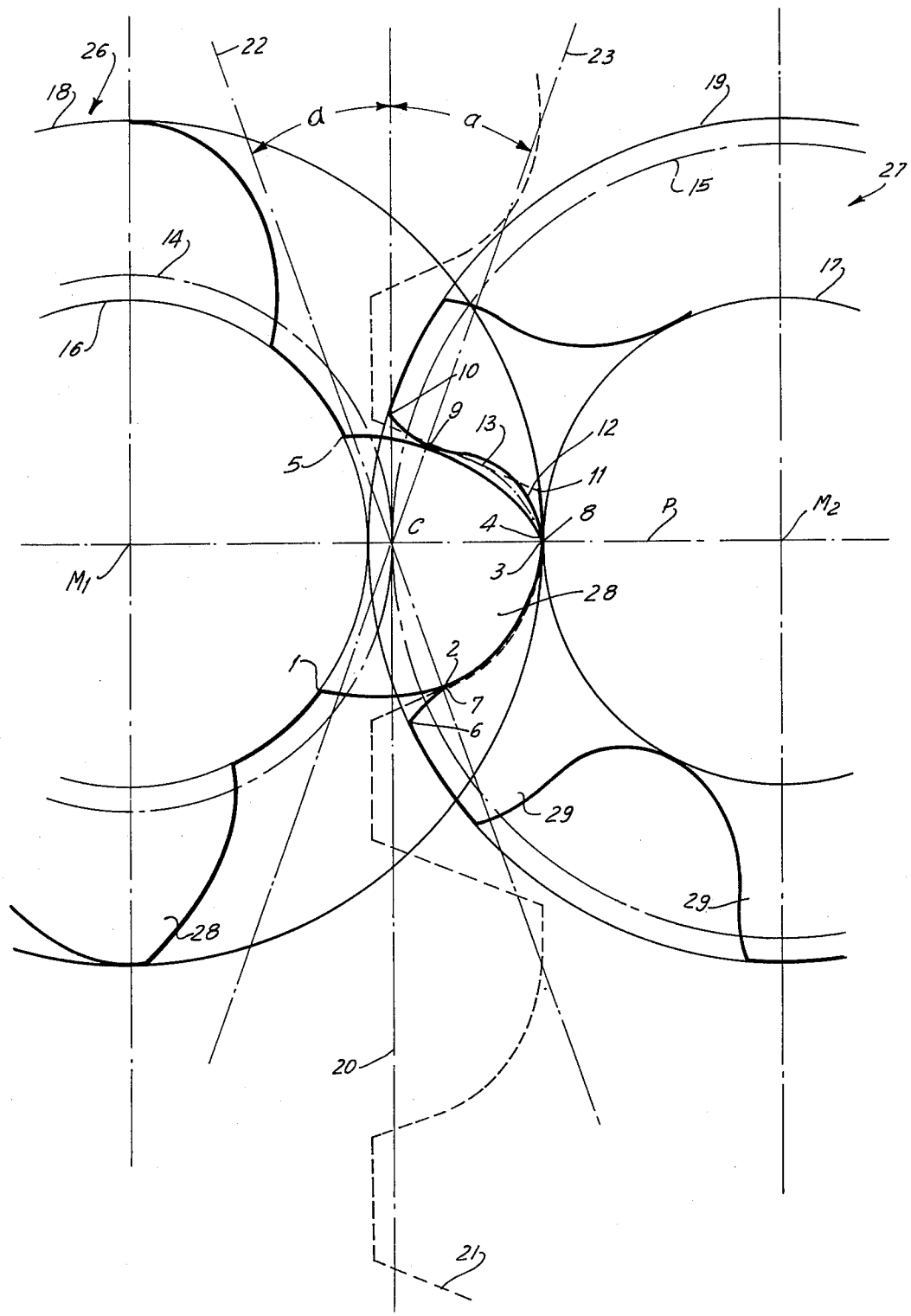
FIGS. 1 – 3 are end views of three embodiments of the present invention largely in diagrammatic form.

As shown in FIG. 1 a main rotor 26 meshes with a secondary rotor 27 with their respective axes $M_1$ and $M_2$ parallel. The base circle 16 of rotor 26 is tangent to the top circle 19 of the rotor 27 along a plane P including the axes $M_1$ and $M_2$. Similarly the base circle 17 of the rotor 27 is tangent to the top circle 18 of the rotor 26. Thus the diameters of circles 16 and 18 are equal to the diameters of circles 17 and 19, respectively.

The meshing circles 14 and 15 of respective rotors 26 and 27 have radii in a 2:3 relationship as the rotor 26 has four teeth or ribs 28 and the rotor 27 has six teeth or ribs 29. Relative to a plane 20 perpendicular to the plane P and passing through this plane P at a point C on the meshing circles 14 and 15 the rotors 26 and 27 have lines of force or pressure 22 and 23 forming force or pressure angles $\alpha$ of 21° as seen from the end as in FIG. 1, this angle being 15° in a plane perpendicular to the individual helical tooth or ridge 28.

The profile of the racks used to cut the teeth 28 and 29 is shown at 21. They coincide along about 75% of its length with each other. This coincidence is interrupted on the teeth 29 between 8 and 9, the tool for the secondary rotor in this region extending along line 13 and for the main rotor along line 11. The profile of the meshing tooth of the main rotor 26 is an involute between 1 and 2, and the tooth 29 of the secondary rotor is an involute between 6 and 7. Immediately adjacent thereto are respective circularly arcuate regions from 2 to 3 and from 7 to 8. The region between 3 and 4 of the tooth 26 lies on the top circle 18 and the region between 4 and 5 is again an involute. This latter involute region corresponds to the involute between 9 and 10 on the tip of the secondary rotor 27. At point 9 the involutes of the tooth 29 are undercut by the tool and formed as a cycloid 12 from 8 to 9 which must cooperate with the region 4 of the main rotor so as to make a tight seal between the two rotors.

The profile of the tool is formed of curved sections as well as of straight sections. Seen in a section perpendicular to the longitudinal axis of the tool the straight sections remain straight only with another angle, while the circularly arcuate portions become elipses and the other curves are transformed.

Figure 2:
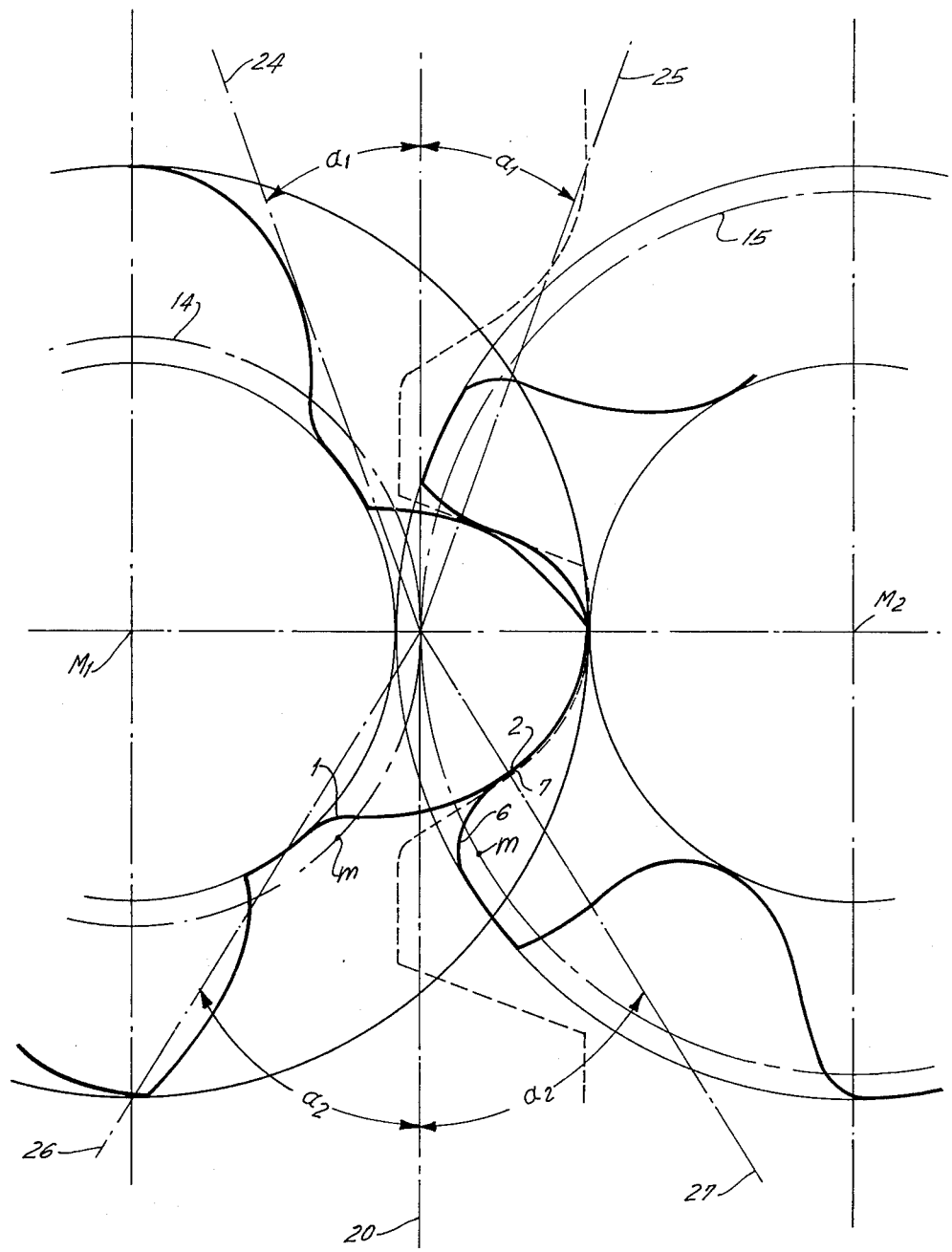

FIG. 2 shows lines of pressure 24 and 25 forming pressure angles $\alpha_1$ which are the same as the angles $\alpha$ of FIG. 1. The pressure lines 24' and 25' form an angle $\alpha_2$ with the plane 20. The angle $\alpha_1$ remains at 15° in a section perpendicular to the respective tooth, corresponding to 21° in the end view shown here, while at the other side of the profile the angle $\alpha_2$ is equal to 25° in a perpendicular section which is 33° in end view. If, for example, a disk miller is used in an indexing method it is set at an angle inclined 5° to the center of the rotor so that on the 15° side a bigger angle and therefore better cutting characteristics are obtained. FIG. 2 also shows roundings of the teeth profiles having centers of curvature $m$ which lie on the meshing circles 14 and 15.

Figure 3:
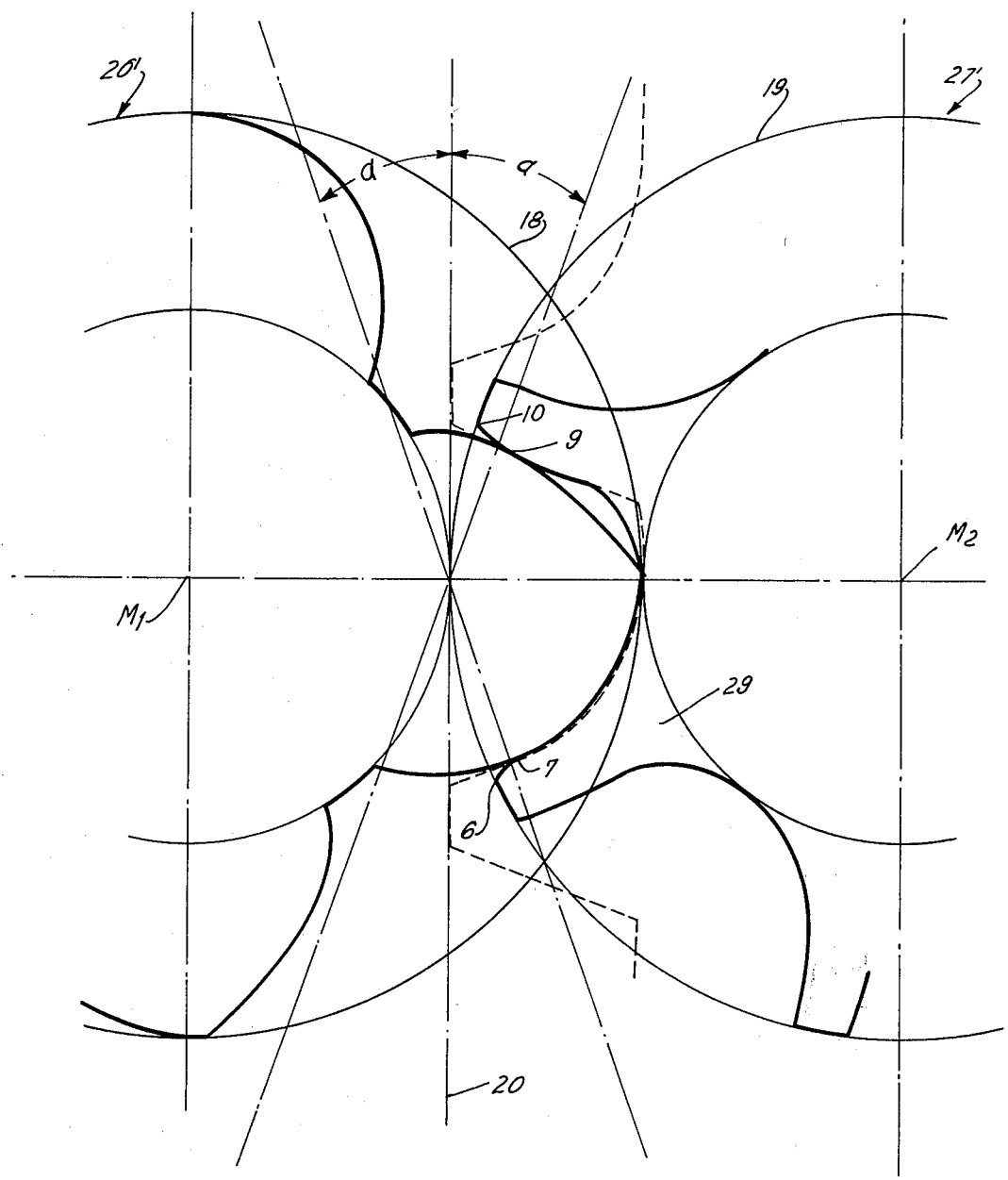

In FIG. 3 there is seen a pair of rotors 26' and 27' whose tip circles 18 and 19 are of like diameter. The secondary rotor 27' however has seven teeth instead of six and the main rotor 26' is formed as shown in FIG. 1. The involute regions 6 – 7 and 9 – 10 are here only half as long as in FIG. 1, and the circular thickness of the teeth 29' of rotor 27' is much smaller than in FIG. 1. This reduction of the involute regions on the tips of the secondary rotor substantially reduces the leakage region between the rotors, whereas the important reduction of the circular thickness is advantageous when the secondary rotor sweeps the housing of the screw machine in which it is used.

Figure 4:
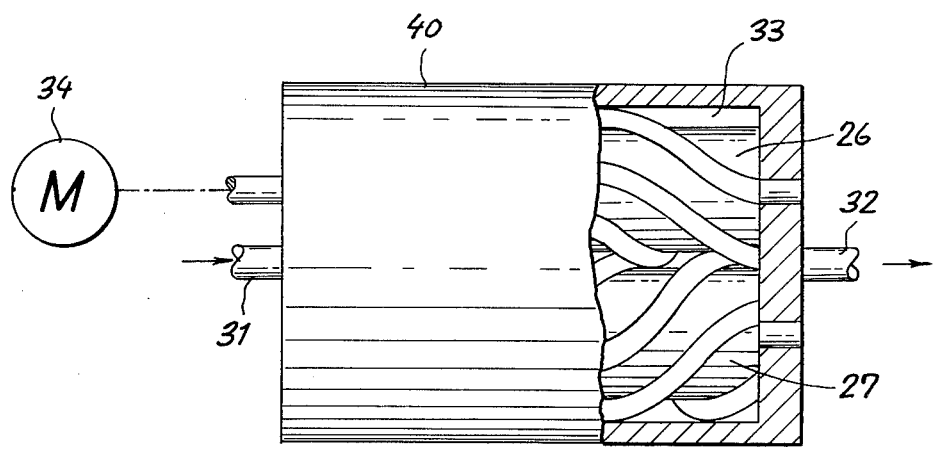
FIG. 4 is an elevational view partly in section illustrating a screw machine according to this invention.

FIG. 4 shows a compressor according to the present invention having a housing 30 with at one end an inlet 31 and at the other end an outlet 32 with a passage 33 extending therebetween. The two rotors 26 and 27 are received in this passage 33 and the rotor 26 is driven by a motor 34. Gas is drawn in through the inlet 31, compressed as it is passed axially, and expelled through the outlet 32.

Figure 5:
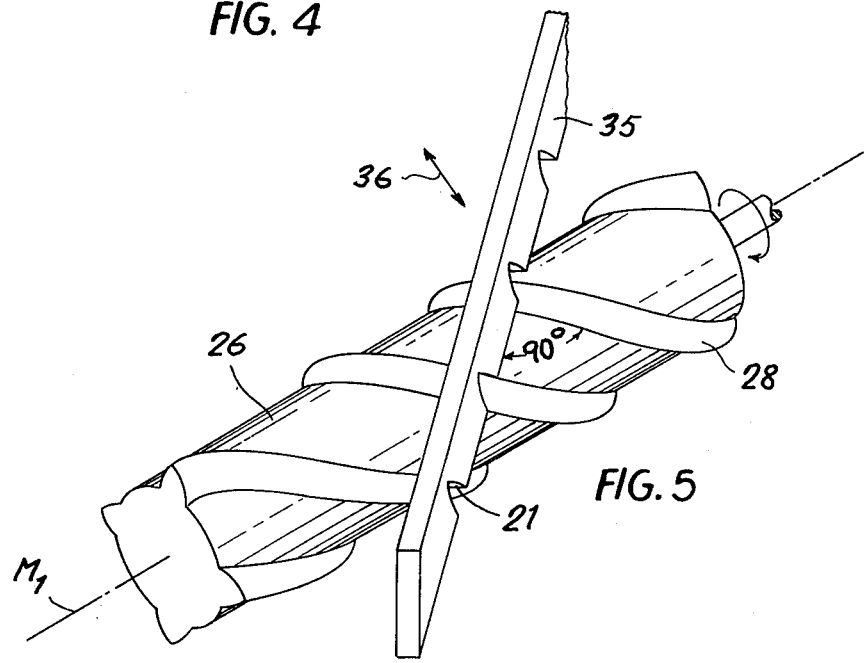
FIG. 5 shows the cutting of the teeth in the rotor.

FIG. 5 illustrates how a rack 35 with the shape shown in FIG. 1 is used to cut the teeth 28 in the rotor 26. This rack 35 is reciprocated back and forth parallel to its own longitudinal axis as shown by the doubleheaded arrow 36 while it is reciprocated parallel to the axis $M_1$ of the rotor 26 as this rotor 26 is rotated about its axis at a rate to keep it in mesh with the rack 35 that is constantly displaced toward the axis $M_1$.

I claim:

1. A screw compressor for the compression and axial displacement of a gas, said compressor comprising:
  a housing formed with an axially extending passage having at one axial end a gas inlet and at the other axial end a gas outlet;
  a one-piece main rotor extending axially in said passage and formed with a plurality of helical ribs having generally convex flanks and root regions formed at least partially as involutes in cross section, said ribs being asymmetrical with respect to the centers of said ribs, each rib of said main rotor having a profile consisting of a leading flank formed as an involute (1-2) from a point (1) at its junction with the respective root region to an intermediate location (2) along said leading flank and a circular arc (2¾) from said intermediate location (2) to a circular arc apex (3,4) of the rib, and a trailing flank (¾-5) formed as an involute from said apex (3,4) to the junction point (5) of said trailing flank with a respective root portion;

a one-piece auxiliary rotor extending axially in said passage and formed with a respective plurality of helical ribs meshing with said ribs of said main rotor and having opposite flanks, the leading flank of each rib of said auxiliary rotor being formed as a concave cycloid (8-9/7-8) from the root point (8) to an intermediate location (7,9) along the leading flank, the trailing flank being formed as a circular arc from said root point to an intermediate location along the trailing flank, and both flanks further being formed as convex involutes (6-7/9-10) from the latter intermediate locations (7,9) to the crown (6,10) of each rib at the auxiliary rotor; and drive means connected only to said main rotor for rotating same and thereby rotating said auxiliary rotor in mesh therewith, said flanks being of arcuate shape adjacent their regions shaped as involutes, relative to a rotation direction of the respective rotor the front flanks of said ribs having a different pressure angle from the back flanks.

* * * * *